United States Patent
Schena (10) Patent No.: US 7,391,173 B2
(45) Date of Patent: Jun. 24, 2008

(54) MECHANICALLY DECOUPLED CAPSTAN DRIVE

(75) Inventor: Bruce M. Schena, Menlo Park, CA (US)

(73) Assignee: Intuitive Surgical, Inc, Sunnyvale, CA (US)

( * ) Notice: Subject to any disclaimer, the term of this patent is extended or adjusted under 35 U.S.C. 154(b) by 0 days.

(21) Appl. No.: 11/428,326

(22) Filed: Jun. 30, 2006

(65) Prior Publication Data

US 2008/0001559 A1 Jan. 3, 2008

(51) Int. Cl.
*H02P 1/54* (2006.01)
(52) U.S. Cl. .................. 318/34; 318/51; 318/68
(58) Field of Classification Search .......... 318/68, 318/34, 41, 51, 625, 135
See application file for complete search history.

(56) References Cited

U.S. PATENT DOCUMENTS

| | | | | |
|---|---|---|---|---|
| 5,368,400 | A | * 11/1994 | Cyphert et al. | 400/124.01 |
| 5,392,502 | A | * 2/1995 | Freer | 29/52 |
| 5,710,870 | A | 1/1998 | Ohm | |
| 5,784,542 | A | 7/1998 | Ohm | |
| 5,828,197 | A | * 10/1998 | Martin et al. | 318/567 |
| 6,233,504 | B1 | 5/2001 | Das | |
| 6,385,509 | B2 | 5/2002 | Das | |

OTHER PUBLICATIONS

Vertut, Jean and Philippe Coiffet, *Teleoperation and Robotics: Evolution and Development*, English translation Prentice-Hall, Inc., Inglewood Cliffs, NJ, USA, 1986.
Goertz, Ray et al., "ANL Mark E4A Electric Master-Slave Manipulator," American Nuclear Society 14th Conference on Remote Systems Technology, 1966, pp. 115-123.
McAffee, Douglas et al., "Teleoperator Subsystem/Telerobot Demonstrator: Force Reflecting Hand Controller Equipment Manual," JPL 1988, JPL D-5172.

* cited by examiner

*Primary Examiner*—Rina I Duda (57) ABSTRACT

A capstan drive includes a first capstan that moves a device on a carriage and a second capstan that receives a second rotary motion to move the carriage. A first power transmission has a driven shaft coupled to the first capstan, a first drive shaft coaxial with the driven shaft to receive a first rotary motion for driving the device, and a second drive shaft coaxial with the driven shaft. A second power transmission couples the second rotary motion to the second drive shaft. The second power transmission has a drive ratio such that if there is no first rotary motion, a first cable is drawn in by the first capstan at the same rate as a second cable is drawn in by the second capstan in response to the second rotary motion.

24 Claims, 5 Drawing Sheets

MECHANICALLY DECOUPLED CAPSTAN DRIVE

FIELD

The embodiments of the invention relate generally to robotic surgical systems. More particularly, the embodiments of the invention relate to cable drive systems in robotic surgical arms.

BACKGROUND

Minimally invasive surgery (MIS) provides surgical techniques for operating on a patient through small incisions using a camera and elongated surgical instruments introduced to an internal surgical site, often through trocar sleeves or cannulas. The surgical site often comprises a body cavity, such as the patient's abdomen. The body cavity may optionally be distended using a clear fluid such as an insufflation gas. In traditional minimally invasive surgery, the surgeon manipulates tissue using end effectors of the elongated surgical instruments by actuating the instrument's handles while viewing the surgical site on a video monitor.

A common form of minimally invasive surgery is endoscopy. Laparoscopy is a type of endoscopy for performing minimally invasive inspection and surgery inside the abdominal cavity. In standard laparoscopic surgery, a patient's abdomen is insufflated with gas, and cannula sleeves are passed through small (generally ½ inch or less) incisions to provide entry ports for laparoscopic surgical instruments. The laparoscopic surgical instruments generally include a laparoscope (for viewing the surgical field) and working tools. The working tools are similar to those used in conventional (open) surgery, except that the working end or end effector of each tool is separated from its handle by a tool shaft. As used herein, the term "end effector" means the actual working part of the surgical instrument and can include clamps, graspers, scissors, staplers, image capture lenses, and needle holders, for example. To perform surgical procedures, the surgeon passes these working tools or instruments through the cannula sleeves to an internal surgical site and manipulates them from outside the abdomen. The surgeon monitors the procedure by means of a monitor that displays an image of the surgical site taken from the laparoscope. Similar endoscopic techniques are employed in other types of surgeries such as arthroscopy, retroperitoneoscopy, pelviscopy, nephroscopy, cystoscopy, cisternoscopy, sinoscopy, hysteroscopy, urethroscopy, and the like.

It will be appreciated that all the drawings of Figures provide for herein are for illustrative purposes only and do not necessarily reflect the actual shape, size, or dimensions of the elements being illustrated.

DETAILED DESCRIPTION OF THE INVENTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and elements have not been described in detail so as not to unnecessarily obscure aspects of the embodiments of the invention.

The embodiments of the invention include methods, apparatus and systems for a mechanically decoupled capstan drive.

In one embodiment of the invention a capstan drive is provided. The capstan drive includes a first capstan, a first power transmission, a second capstan, and a second power transmission. The first capstan moves a device on a moveable carriage. The device may be a rotatable instrument driver to control a robotic surgical tool. The first power transmission has a driven shaft coupled to the first capstan, a first drive shaft coaxial with the driven shaft to receive a first rotary motion to drive the device, and a second drive shaft coaxial with the driven shaft. The second capstan receives a second rotary motion to move the moveable carriage. The second power transmission couples the second rotary motion to the second drive shaft of the first power transmission. The second power transmission has a drive ratio such that if there is no first rotary motion, a first cable pays out from the first capstan at the same rate as a second cable pays out from the second capstan in response to the second rotary motion.

In another embodiment of the invention, a method of moving a device on a carriage is provided. The device may be a rotatable instrument driver to control a robotic surgical tool. The method includes rotating a first capstan to drive a first cable at a first rate that moves the device on the moveable carriage; rotating a second capstan to drive a second cable at a second rate that moves the moveable carriage; and coupling the rotation of the second capstan to the first capstan. This is to substantially cancel motion of the first cable relative to the moveable carriage where the cancelled motion is due to the rotation of the second capstan. That is, the first rotational coupling means couples the rotation of the second capstan to the first capstan to cause the first capstan to drive the first cable at the sum of the first cable rate and the second cable rate such that the motion of the device on the carriage is substantially decoupled from the motion of the carriage.

In yet another embodiment of the invention, a capstan drive is provided that includes a first rotating means, a second rotating means, and a first rotational coupling means. The first rotating means rotates a first capstan to drive a first cable that moves a device on a carriage. The device may be a rotatable instrument driver to control a robotic surgical tool. The second rotating means rotates a second capstan to drive a second cable that moves the carriage. The first rotational coupling means couples the rotation of the second capstan to the first capstan to substantially cancel motion of the first cable relative to the motion of the carriage due to the rotation of the second capstan.

The detailed description describes the invention as it may be used in laparoscopic surgery. It is to be understood that this is merely one example of the types of surgeries in which the invention may be used. The invention is not limited to laparoscopy nor to the particular structural configurations shown which are merely examples to aid in the understanding of the invention. Traditional minimally invasive surgery requires a high degree of surgical skill because the surgeon's hand movements are controlling a surgical tool at a substantial distance from the surgeon's hands, often requiring unnatural and non-intuitive hand motions. In robotically assisted surgery, a surgeon may operate a master controller to control the motion of surgical instruments at the surgical site. Servo mechanisms may move and articulate the surgical instrument based on the surgeon's manipulation of the hand input devices. The robotic assistance may allow the surgeon to control the motion of surgical instruments more easily and with greater precision.

Figures 1, 2:
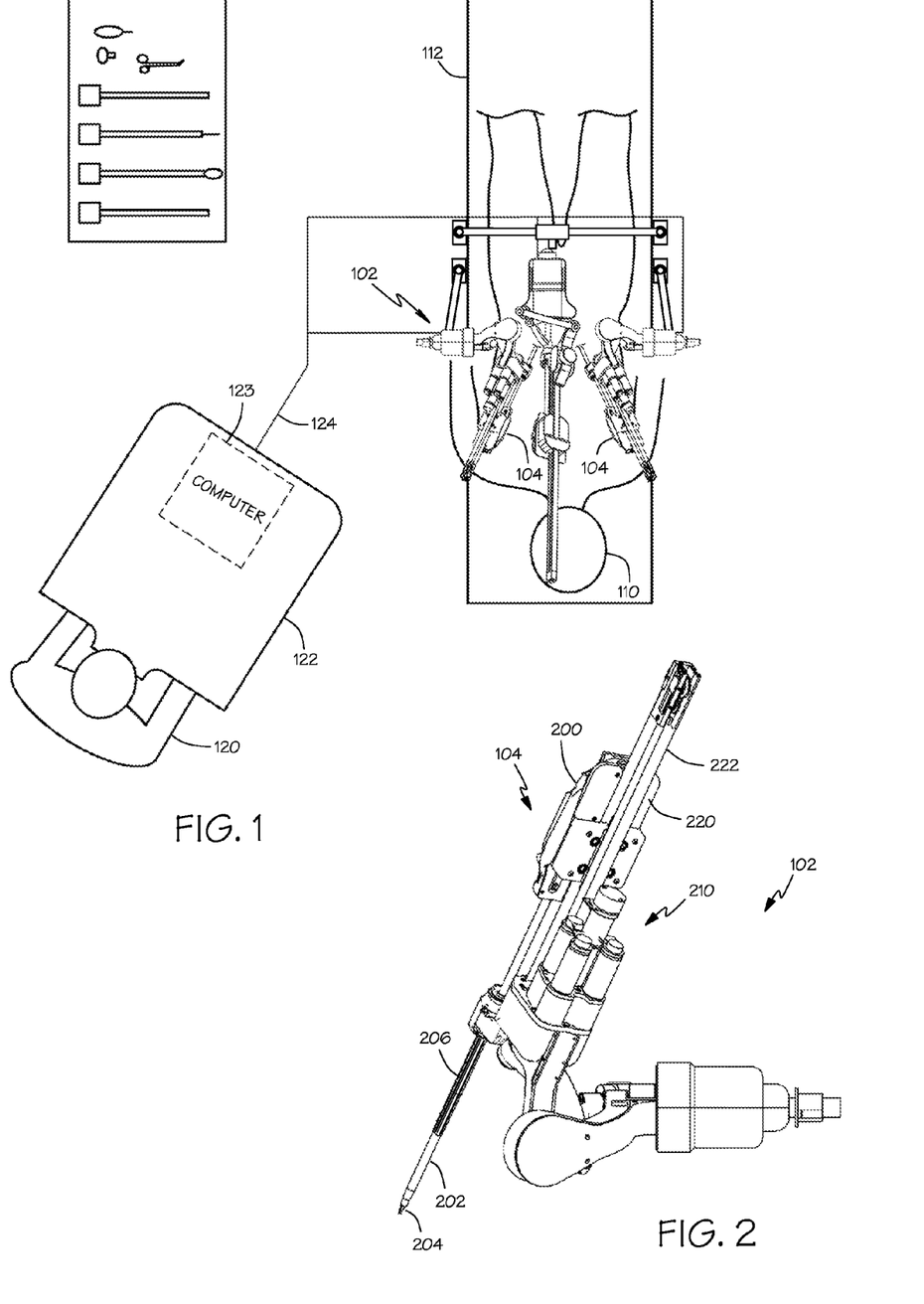
FIG. 1 is a plan view of a surgical suite in which embodiments of the invention are used.
FIG. 2 is a pictorial view of a robotic arm and surgical instrument from the operating suite of FIG. 1.

FIG. 1 shows a schematic plan view of a surgical suite in which the invention may be used. A patient 110 is shown on an operating table 112 undergoing robotically assisted laparoscopic surgery. A surgeon 120 may use a master controller 122 to view a video image of the internal surgical site and control one or more surgical instruments and a laparoscopic camera by means of robotic servo mechanisms. The master controller 122 will typically include one or more hand input devices (such as joysticks, exoskeletal gloves, or the like) which are coupled by a servo mechanism to a surgical instrument. One or more robotic arms 102 that embody the invention may be used to support and move surgical instruments 104 at the surgical site during robotically assisted surgery.

FIG. 2 shows a robotic arm 102 supporting a surgical instrument 104. The surgical instrument 104 may include a head end 200 coupled to an end effector 204 by a tool shaft 202. The end effector 204 and tool shaft 202 may be inserted into a surgical site through a cannula 206 that is supported by the robotic arm 102. The end effector 204 at the distal end of the tool shaft 202 may provide any of a variety of surgical tools which may be inserted into a surgical site and actuated by servo mechanisms 210 which may be supported by the robotic arm 102. The head end 200 of the surgical instrument 104 may include one or more receiving elements that control the movement of the end effector 204.

The head end 200 of the surgical instrument 104 may be coupled to a tool carriage 220 on the robotic arm 102. This may facilitate exchange of the surgical instrument 104 during the course of a surgical procedure. The tool carriage 220 may be slidingly supported by a spar 222 that is supported by the robotic arm 102. The tool carriage 220 may be moved along the spar 222 to change the depth of insertion of the end effector 204 by moving the entire surgical instrument 104. The robotic arm 102 may include one or more servo motors 210 to move the surgical instrument 104 and/or the end effector 204 on the surgical instrument.

Referring again to FIG. 1, one or more control wires 124 may provide signals between the computer 123 in the master controller 122 and the servo motors 210 on the robotic arm 102. The master controller 122 may include a computer 123 to provide signals that control the servo mechanisms 210 of the surgical instrument 104 based on the surgeon's input and received feedback from the servo mechanisms.

Figure 3:
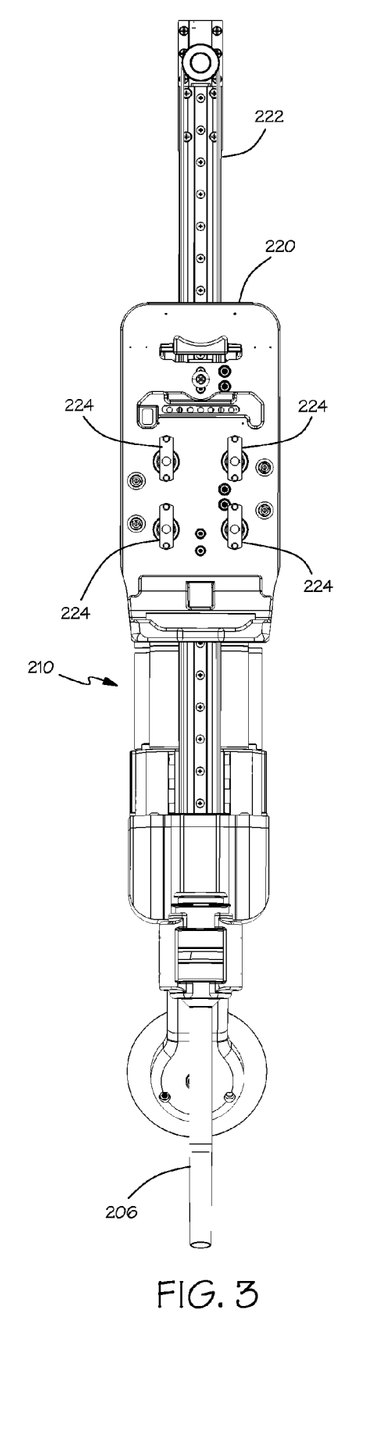
FIG. 3 is an elevation of a portion of the robotic arm of FIG. 2 that supports the surgical instrument.

FIG. 3 shows the spar 222, the tool carriage 220, and the servo motors 210 removed from the robotic arm. The servo motors 210 may move the tool carriage 220 laterally along the spar 222 to adjust the depth of insertion of the surgical instrument carried by the tool carriage and the end effector on the surgical instrument.

The servo motors 210 may further move the end effector. The end effector 204 may be moved by rotating receiving elements provided in the head end 200 of the surgical instrument 104. Each receiving element in the surgical instrument 104 may be coupled to a rotatable instrument driver 224 provided on the tool carriage 220. The end effector may be arranged such that approximately one revolution or less of one of the rotatable instrument drivers 224 moves the end effector through its full range of motion as controlled by that driver. Thus, one or more servo motors 210 may be coupled to the surgical instrument 104 to control motions of the end effector 204.

Figure 4:
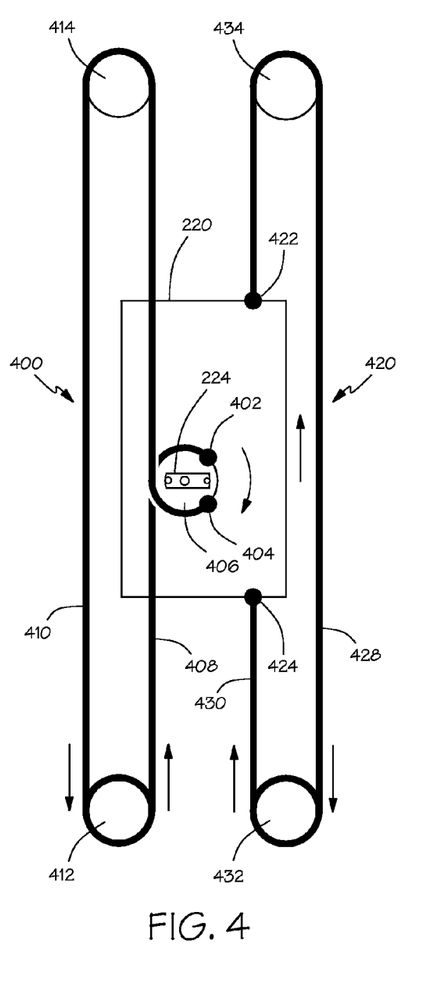
FIG. 4 is a schematic of cable loops that provide control movement of the surgical instrument.

FIG. 4 shows a schematic of two cable loops 400, 420 for controlling motion of a surgical instrument. One of the cable loops 400 may be used to rotate one of the instrument drivers 224 on the tool carriage 220. The other cable loop 420 may move the tool carriage 220 along the spar to adjust the position of the end effector. For the purposes of this invention, a cable loop is used to describe a mechanical power transmission by means of a long "cable", such as a wire or fiber cable or a thin belt or band, in which one part of the cable is drawn in by the driving mechanism while an equal amount of the cable is payed out when the cable loop is driven. Driving the cable loop causes one part of the cable loop to be drawn in at a rate while another part of the cable loop payed out at the same rate. The numerical rate at which a cable loop is payed out has the opposite sign from the numerical rate at which a cable loop is drawn in while the absolute values are equal. This results in a motion of the cable comparable to the motion of a continuous loop of cable. However, for the purposes of this invention, the "cable loop" need not physically be in the form of a continuous loop of cable.

One cable loop 400 may be used to provide the rotary motion of a rotatable instrument driver 224 through a driver pulley 406 coupled thereto. A single cable segment 400 is shown wrapped around a capstan 412 that drives the cable loop. Each of two ends 402, 404 of the cable loop 400 is coupled to one of two coupled driver pulleys 406. The pulleys 406 are rotated as a first portion 408 of the cable 400 is drawn in by the capstan 412 while a second portion 410 of the cable is payed out and passed around an outboard pulley 414. It will be appreciated that two or more cable segments could be used to control the rotation of the rotatable instrument driver 224. For example, the cable loop 400 could include segments having ends that are coupled to the capstan 412.

A second cable loop 420 may be used to provide the linear motion of the tool carriage 220 along the spar 222. A single cable segment 420 is shown wrapped around a capstan 432 that drives the cable loop. Each of the two ends 422, 424 of the cable loop is coupled to the tool carriage 220 such that the tool carriage is moved along the length of the spar 222 as a first portion 428 of the cable 420 is drawn in by the capstan 432 after passing around an outboard pulley 434 while a second portion 430 of the cable is payed out. It will be appreciated that two or more cable segments could be used to control the motion of the tool carriage as described above for the rotary driver. Additional pulleys (not shown) may be provided between the capstans 412, 432 and the outboard pulleys 414, 434 to direct the cables 400, 420 as required.

It may be noted that moving the tool carriage 220 along the length of the spar, by rotation of the capstan 432 that drives the cable 420 coupled to the tool carriage, will cause rotation of the instrument driver 224 if the capstan 412 that drives the instrument driver is stationary. This is because the movement of the tool carriage 220 moves the instrument driver 224 relative to the cable loop 400 that is coupled to the driver. That is, the instrument driver 224 may be rotated by the movement of the cable loop 400 connected to the driver relative to the tool carriage 220. The relative movement of the cable loop 400 may be the result of rotating the capstan 412 coupled to the cable loop or movement of the tool carriage 220.

Figure 5:
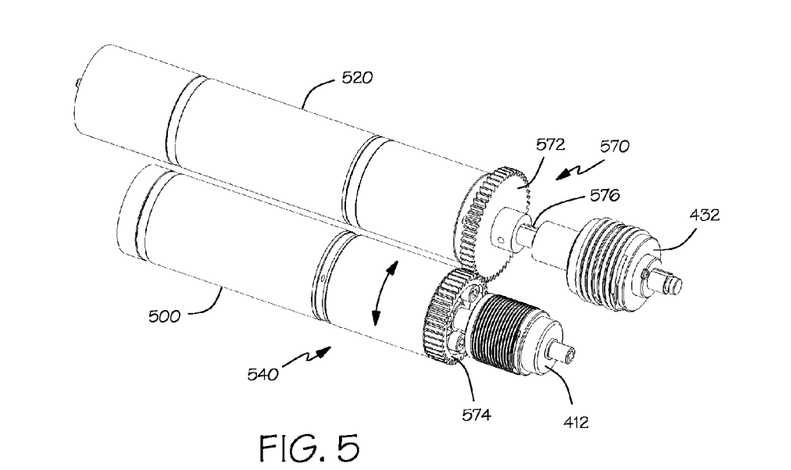
FIG. 5 is a pictorial view of a capstan drive that embodies the invention.

As shown in FIG. 5, an embodiment of the present invention provides a first servo motor 500 that rotates the first capstan 412 to drive the instrument driver 224 on the tool carriage 220 and a second servo motor 520 that rotates the second capstan 432 to move the tool carriage along the spar 222. Either or both of the servo motors may be a geared motor to reduce the speed and/or increase the torque. Gearing of the servo motors is not required for the purposes of the invention nor does it affect the operation of the invention.

An epicyclic gear train 540 provides two rotary inputs and a rotary output. The epicyclic gear train 540 couples the first servo motor 500 and the second servo motor 520 to the first capstan 412. As suggested by the two-headed arrow on the case of the epicyclic gear train 540, the case may be supported in a manner that allows it to rotate relative to the body of the coaxial first servo motor 500.

Figure 6:
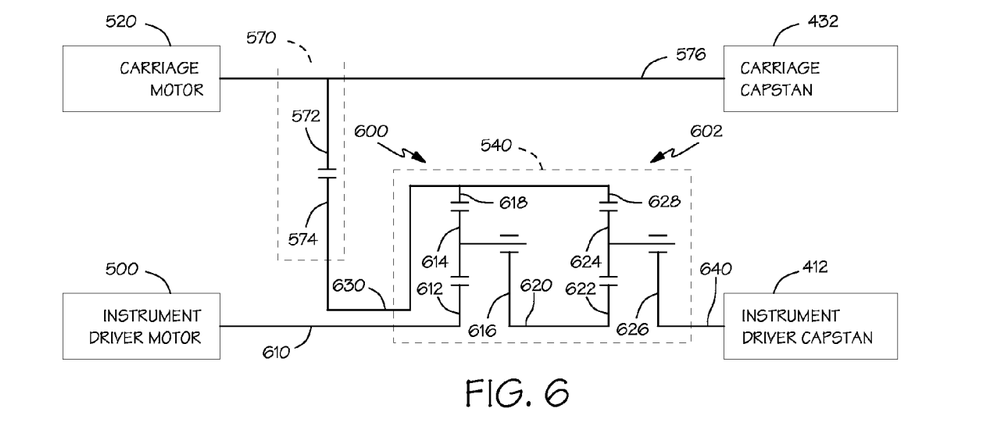
FIG. 6 is a schematic view of the capstan drive of FIG. 5.

FIG. 6 is a schematic representation of the gear train of the embodiment illustrated in FIG. 5. The first servo motor 500 is coupled to a first one 610 of the two rotary inputs 610, 630 of the epicyclic gear train 540. The second servo motor 520 is coupled to a second one 630 of the two rotary inputs through a power transmission 570. The power transmission 570 is driven by a carriage drive shaft 576 that couples the rotary motion of the second servo motor 520 to the second capstan 432. The power transmission provides a positive coupling of the rotation of the carriage drive shaft 576 to the second one 630 of the two rotary inputs of the epicyclic gear train 540. The power transmission 570 allows the second motor 520 to be coupled both to the second capstan 432 and to the second one 630 of the two rotary inputs. The power transmission 570 may provide a drive ratio between the second capstan 432 and the second one 630 of the two rotary inputs such that the second one of the two rotary inputs rotates at a different speed than the second capstan 432. The power transmission may be of any of a variety forms such as a pair of gears 572, 574 as shown, a toothed belt, a chain and sprocket drive, or other method of positive transmission of rotary motion.

The coupling of the first servo motor 500 and the second servo motor 520 to the first capstan 412 and the second capstan 432 is arranged such that the movement of the instrument driver 224 as controlled by the first servo motor is decoupled from the movement of the tool carriage 220 as controlled by the second servo motor. The second cable 420, which is routed over pulley 434 at the top of the spar, is drawn in by the second capstan 432 at a first rate and in the first direction in response to the second rotary motion provided by the second servo motor 520. When there is no first rotary motion provided by the first servo motor 500, the first cable 400, which is routed over the pulley 414 also at the top of the spar, is drawn in by the first capstan 412 at the first rate and in the first direction in response to the second rotary motion provided by the second servo motor 520.

That is, if the first servo motor 500 doesn't rotate, the transmission 570 and epicyclic gearing 540 cause the first capstan 412 to rotate along with the second capstan 432 so that the cables 400, 420 are driven at the same rate and in the same direction from both capstans. As a result, there is no relative movement between the cables 400, 420 and the tool carriage 220 can be moved by the second cable 420 while the instrument driver 224 on the carriage controlled by the first cable 400 remains stationary.

It will be appreciated that if the first servo motor 500 does rotate, a relative motion will be introduced into the first cable 400 that will move the instrument driver 224 with a motion that is determined only by the first servo motor and without regard to the rate of motion of the tool carriage 220. More particularly, the first servo motor 500 rotates the first capstan 412 to drive the first cable 400 at a first rate that moves the device 224 on the carriage 220. The second servo motor 520 rotates the second capstan 412 to drive the second cable 420 at a second rate that moves the carriage 220. The coupling of the rotation of the second capstan 432 to the first capstan 412 causes the first capstan to drive the first cable 400 at the sum of the first rate and the second rate such that the motion of the device 224 on the carriage 220 is substantially decoupled from the motion of the carriage. The device 224 on the carriage 220 is only affected by difference in the movement of the first cable 400 relative to the second cable 420.

A capstan drive that embodies the invention allows driving a device, such as an instrument driver 224, on a moving carriage 220. The second capstan 432 is rotated to move the carriage 220. A rotating means, such as the servo motor 500, provides a rotational force for rotating the first capstan 412 to drive the instrument driver 224 on the carriage 220. The power transmission 570 couples the rotation of the second capstan 432 to the epicyclic gear train 540. The epicyclic gear train 540 couples the rotation of the second capstan 432 and the rotation of the servo motor 500 for rotating the first capstan such that the first cable 400 is drawn in by the first capstan 412 at the same rate and in the same direction as the second cable 420 is drawn in by the second capstan 432 when the second capstan is rotated and the means for rotating the first capstan is stationary. In so doing, any motion of instrument driver 224 that is induced by the motion of carriage 220 is minimized. Thus rotation of the servo motor 500 for rotating the first capstan 412 controls the instrument driver 224 on the carriage 220 without being affected by motion of the carriage.

Referring again to FIG. 6, the epicyclic gear train 540 may be a planetary gear arrangement. The output or driven shaft 640 may be coupled to a planetary gear carrier 626. The first drive shaft 610 may be coupled to a sun gear 612. The second drive shaft 630 may be coupled to a ring gear 618. It may be appreciated that the second drive shaft 630 may be the case of the epicyclic gear train 540 which may be fixed to the outside of the ring gear 618. While the power transmission 570 is shown coupled to the second drive shaft 630 at the same end of the epicyclic gear train 540 as the first drive shaft 610 so that the flow of power is left to right in the schematic, the power transmission 570 is coupled to the second drive shaft 630 at the opposite end of the epicyclic gear train 540 in the embodiment shown in FIG. 5 to provide a more advantageous assembly.

The epicyclic gear train 540 may be a compound planetary gear train having a first planetary gear arrangement 600 and a second planetary gear arrangement 602. A planetary gear carrier 616 of the first planetary gear arrangement 600 may be coupled by an intermediate shaft 620 to a sun gear 622 of the second planetary gear arrangement 602. The second drive shaft 630 may be coupled to the ring gears 618, 628 of the first and second planetary gear arrangements 600, 602, where both ring gears may be portions of one gear or two gears that are coupled to rotate in unison.

The epicyclic gear train 540 may provide a first drive ratio of R1 between the driven shaft 640 and the second drive shaft 630 when the first drive shaft 610 is stationary. If the epicyclic gear train 540 is a planetary gear train, this may be described as a solar arrangement with the ring gear 618 and planetary gears 614 rotating around a stationary sun gear 612. A planetary gear train that provides a ratio of N between the driven shaft 640 and the first drive shaft 610 when the ring gear 618 is stationary, a planetary arrangement, will provide a ratio of R1=(N−1)/N in a solar arrangement. The power transmission 570 may provide a second drive ratio of R2 between the second drive shaft 630 and the carriage drive shaft 576 that couples the second rotary motion provided by the second motor 520 to the second capstan 432.

If the second capstan 432 has a second pitch diameter, D2, then providing the first capstan 412 with a first pitch diameter, D1, that is substantially the same as the second pitch diameter divided by a product of the first drive ratio and the second drive ratio, D1=D2/(R1×R2), will provide a drive system in which the first cable 400 is drawn in by the first capstan 412 at the same rate as the second cable 420 is drawn in by the second capstan 432 when the means 520 for rotating the second capstan 432 is active and the means 500 for rotating the first capstan 412 is stationary.

For example, the epicyclic gear train 540 may have a first drive ratio of 15/16 between the driven shaft 640 and the second drive shaft 630. The power transmission 570 may have a second drive ratio of 5/4 between the second drive shaft 630 and the shaft 576 that provides the second rotary motion to the second capstan 432. If the second capstan has a second pitch diameter, D2, of 0.755 inches, then a first capstan 412 having a pitch diameter of substantially 0.644 inches will provide the desired decoupling of the means 500 for rotating the first capstan from the motion of the carriage 220.

It will be appreciated that when both cables 400, 420 are drawn in at the same rate, the tool carriage 220 will be moved laterally while the instrument driver 224 remains stationary. Further, if the means 500 for rotating the first capstan 412 provides a rotary input to move the instrument driver 224, the instrument driver will respond with the same motion regardless of whether or not the tool carriage 220 is moving.

The pitch diameter of the first capstan 412 may be considered substantially the same as the pitch diameter of the second capstan 432 divided by the product of first drive ratio and the second drive ratio when there is no meaningful movement of the instrument driver 224 over the range of motion for the tool carriage 220 if the means 500 for rotating the first capstan is stationary. It will be appreciated that various manufacturing considerations may result in the pitch diameter of the first capstan 412 deviating from the precise diameter determined from the drive ratios. For example, in another embodiment the epicyclic gear train 540 may have a first drive ratio of 0.9391813 between the driven shaft and the second drive shaft. The power transmission may have a second drive ratio of 1.250 between the second drive shaft and the second rotary motion. If the second capstan 432 has a second pitch diameter, D2, of 0.755 inches, then a first capstan 412 having a pitch diameter of 0.6516314 inches will provide the desired decoupling of the means 500 for rotating the first capstan 412 from the means 520 for rotating the second capstan 432. A first capstan 412 having a pitch diameter of 0.655 inches would be considered as being substantially the desired diameter in this case.

Figure 7:
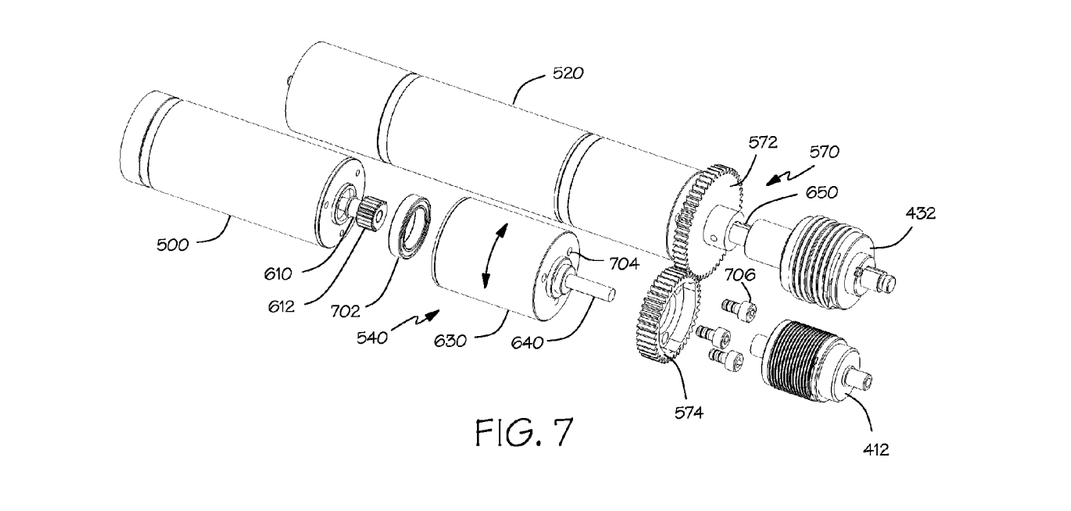
FIG. 7 is an exploded view of the capstan drive of FIG. 5.

FIG. 7 shows an exploded view of the embodiment of the invention shown in FIG. 5. An end of the epicyclic gear train 540 may be supported coaxially on an end of the first servo motor 500 by a bearing 702 to allow the casing of the gear train to rotate with respect to the motor. One of the gears 574 of the power transmission 570 may be fixed to the casing 630 of the gear train, such as by screws 706 that engage threaded holes in the casing. The fixed gear 574, the casing 630, and the ring gear(s) 618, 628 may all move together as a single assembly.

Figure 8:
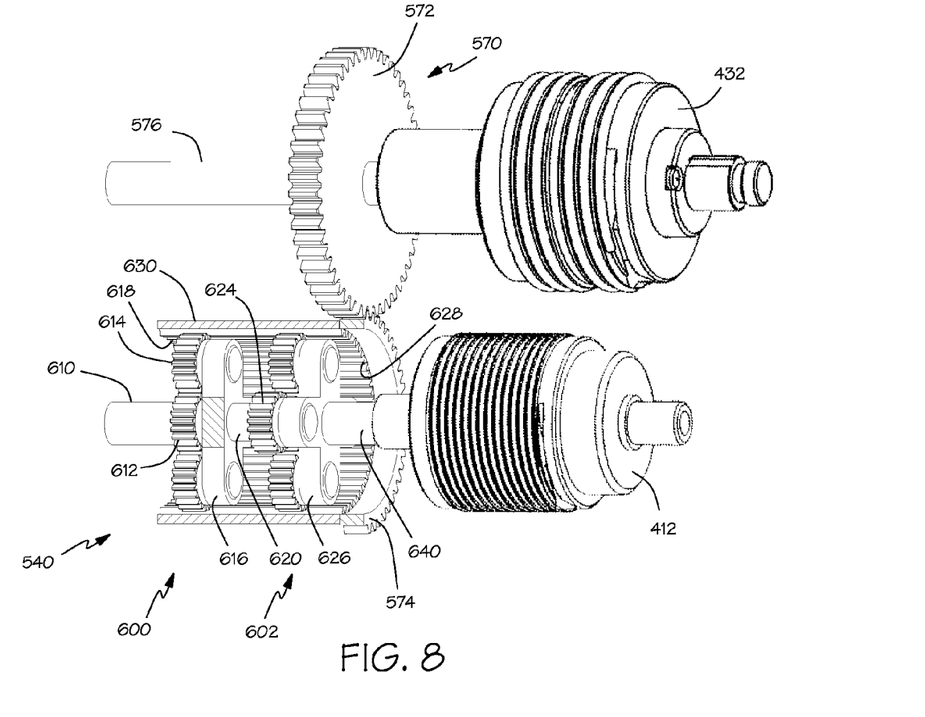
FIG. 8 is a cut-away view of a portion of the capstan drive of FIG. 5.

FIG. 8 illustrates the capstans 412, 432, power transmission 570, and the epicyclic gear train 540 with a portion of the power transmission and the epicyclic gear train cut away to allow the internal parts of the epicyclic gear train 540 to be seen. It should be noted that particular gear arrangement shown is not necessarily a preferred arrangement but merely a possible arrangement that can be clearly shown. For example, while a planetary gear arrangement with four planetary gears is shown, the use of only three planetary gears may be advantageous. A planetary carrier in a disc-like form may be advantageous. It will be appreciated that any type of epicyclic gear train that can provide two inputs to drive one output may be used with the present invention.

In one embodiment of the invention, the epicyclic gear train 540 may be a compound planetary gear arrangement such as one having a first planetary gear arrangement 600 and a second planetary gear arrangement 602 as shown in FIG. 8. In other embodiments, the epicyclic gear train 540 may use a single planetary gear assembly or more than two assemblies, or epicyclic gear arrangements other than planetary arrangements. The first drive shaft 610 may be coupled to a sun gear 612. The second drive shaft 630 may be coupled to a ring gear or gears 618, 628. In a compound gear train, the ring gear for each gear assembly may be provided by a portion of a single gear as shown in FIG. 8. The ring gear 618, 628 may be an internally toothed gear and may be formed as an interior surface of the casing 630 for the epicyclic gear train 540. The casing may function as the second drive shaft 630. The output or driven shaft 640 may be coupled to a planetary gear carrier 626.

As shown in FIG. 8, the epicyclic gear train 540 may be a compound planetary gear train in which the planetary gear carrier 616 of the first planetary gear arrangement 600 may be coupled to a sun gear (not visible in FIG. 8) of the second planetary gear arrangement 602 by the intermediate shaft 620. It should be noted that the first drive shaft 610, the intermediate shaft 620, and the driven shaft 640 are separate shafts. These three shafts rotate at different rates as determined by the rate of rotation of the second drive shaft 630 and by the gear assemblies that couple the various shafts of the epicyclic gear train 540.

Other configurations of epicyclic gear trains having only a single planetary gear train or more than two planetary gear trains may be used with the invention. Other forms of gearing or power transmissions that provide for two rotary inputs to additively rotate a single output may be used with the invention.

Figure 9:
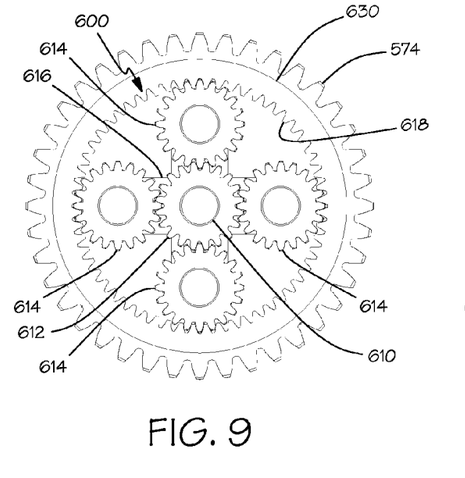
FIG. 9 is end view of a portion of the capstan drive of FIG. 5.
Figure 10:
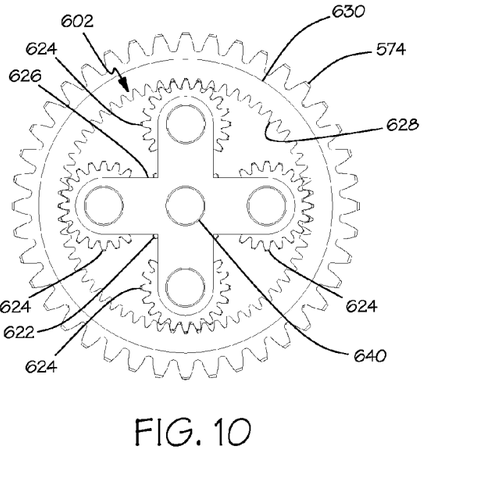
FIG. 10 is end view of a portion of the capstan drive of FIG. 5 from the end opposite that shown in FIG. 9.

The epicyclic gear train 540 may provide a first drive ratio of R1 between the driven shaft 640 and the second drive shaft 630 when the first drive shaft 610 is stationary. If the epicyclic gear train 540 is a planetary gear train this may be described as a solar arrangement with the ring gear 618 and planetary gears 614 rotating around a stationary sun gear 612. The solar arrangement may be more clearly appreciated in FIG. 9 which shows the first planetary gear arrangement 600 from the first input shaft 610 end of the epicyclic gear train 540. FIG. 10 shows the second planetary gear arrangement 602 from the driven shaft 640 end of the epicyclic gear train 540.

A planetary gear train that provides a ratio of N between the driven shaft 640 and the first drive shaft 610 when the ring gear 618 is stationary, a planetary arrangement, will provide a ratio of R1=(N−1)/N in a solar arrangement. The power transmission 570 may provide a second drive ratio of R2 between the second drive shaft 630 and the carriage drive shaft 576 that couples the second rotary motion provided by the second motor 520 to the second capstan 432.

If the second capstan 432 has a second pitch diameter, D2, then providing the first capstan 412 with a first pitch diameter, D1, that is substantially the same as the second pitch diameter divided by a product of the first drive ratio and the second drive ratio, D1=D2/(R1×R2), will provide a drive system in which the first cable 400 is drawn in by the first capstan 412 at the same rate as the second cable 420 is drawn in by the second capstan 432 when the means 520 for rotating the second capstan 432 is active and the means 500 for rotating the first capstan 412 is stationary.

For example, the epicyclic gear train 540 may have a first drive ratio of 15/16 between the driven shaft 640 and the second drive shaft 630. The power transmission 570 may have a second drive ratio of 5/4 between the second drive shaft 630 and the shaft 576 that provides the second rotary motion to the second capstan 432. If the second capstan has a second pitch diameter, D2, of 0.755 inches, then a first capstan 412 having a pitch diameter of substantially 0.644 inches will provide the desired decoupling of the means 500 for rotating the first capstan from the motion of the carriage 220.

It will be appreciated that when both cables 400, 420 are drawn in at the same rate, the tool carriage 220 will be moved laterally while the instrument driver 224 remains stationary. Further, if the means 500 for rotating the first capstan 412 provides a rotary input to move the instrument driver 224, the instrument driver will respond with the same motion regardless of whether or not the tool carriage 220 is moving.

It will be appreciated that various manufacturing considerations may result in the pitch diameter of the first capstan 412 deviating from the precise diameter determined from the drive ratios as described above. For the purposes of this invention, the pitch diameter of the first capstan 412 is considered to be substantially the desired pitch diameter if there is no meaningful movement of the instrument driver 224 over the range of motion for the tool carriage 220 when the means 500 for rotating the first capstan 412 is stationary.

For example, in another embodiment the epicyclic gear train 540 may have a first drive ratio of 0.9392 between the driven shaft and the second drive shaft. The power transmission may have a second drive ratio of 1.250 between the second drive shaft and the second rotary motion. If the second capstan 432 has a second pitch diameter, D2, of 0.755 inches, then a first capstan 412 having a pitch diameter of about 0.6516 inches will provide the desired decoupling of the means 500 for rotating the first capstan 412 from the means 520 for rotating the second capstan 432. A first capstan 412 having a pitch diameter of 0.655 inches would be considered as being substantially the desired diameter in this case.

Normally the objective is to fully decouple the movement of devices on the carriage from the movement of the carriage. However, it is possible to select gear ratios that deliberately provide some relative movement between the device if it desired to undercompensate or overcompensate for the movement of the carriage.

Figure 11:
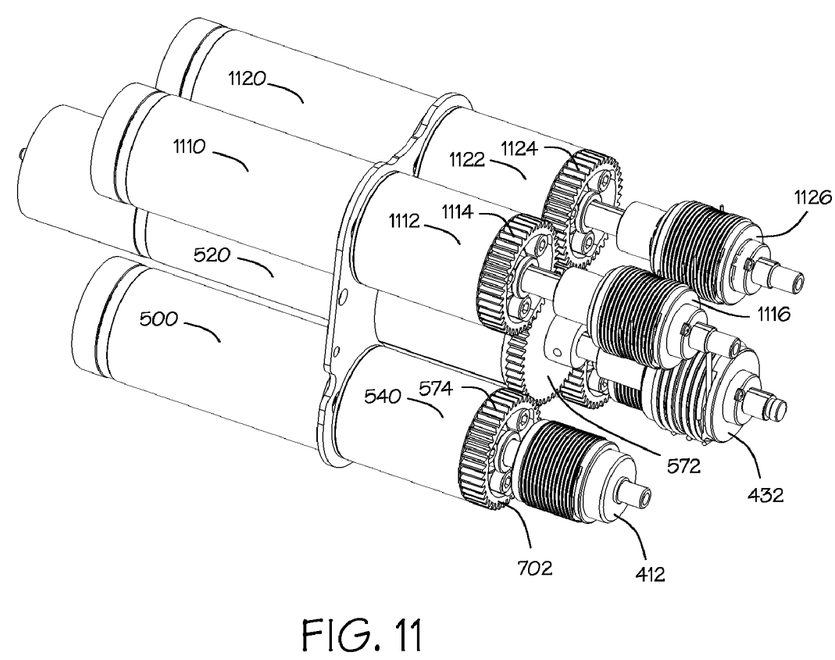
FIG. 11 is a pictorial view of another capstan drive that embodies the invention.

As shown by the embodiment of the invention of FIG. 11, additional capstans 1116, 1126 may be provided to control additional instrument drivers 224 on the moving carriage 220. For each additional capstan 1116, 1126 there may be an additional servo motor means 1110, 1120 for rotating the capstan and an additional epicyclic gear train 1112, 1122 that couples the means for rotating to the capstan through a first drive shaft of the additional epicyclic gear train. The power transmissions that couple the rotation of the second capstan 432 to a second drive shaft of the additional epicyclic gear trains 1112, 1122 may advantageously use a common first gear 572 coupled to an additional second gear 1114, 1124 for each of the additional epicyclic gear trains. This arrangement permits a number of instrument drivers 224 to be independently controlled on a moving carriage 220 without regard to the movement of the carriage as controlled by the second capstan 432. The second capstans 412, 1116, 1126 may be referred to as instrument driver capstans. The first capstan 432 may be referred to as the carriage translation capstan.

It should be noted that the number of decoupled second capstans is arbitrary. While three instrument driver capstans 412, 1116, 1126 are identified in FIG. 11, it may be noted that a fourth instrument driver capstans is present although largely obscured by other parts of the illustrated configuration. The illustrated configuration provides four decoupled instrument driver capstans to drive the four instrument drivers 224 shown on the tool carriage 220 of FIG. 3.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A capstan drive comprising:
   a first capstan to move a device on a carriage;
   a first power transmission having a driven shaft coupled to the first capstan, a first drive shaft coaxial with the driven shaft to receive a first rotary motion for driving the device, and a second drive shaft coaxial with the driven shaft;
   a second capstan to receive a second rotary motion to move the carriage; and
   a second power transmission to couple the second rotary motion to the second drive shaft, the second power transmission having a drive ratio such that if there is no first rotary motion, a first cable is driven by the first capstan at a same rate as a second cable is driven by the second capstan in response to the second rotary motion.

2. The capstan drive of claim 1, wherein:
   the first power transmission has a first drive ratio of R1 between the driven shaft and the second drive shaft;
   the second power transmission has a second drive ratio of R2 between the second drive shaft and the second rotary motion;
   the second capstan has a second pitch diameter, D2; and
   the first capstan has a first pitch diameter, D1, that is substantially the same as the second pitch diameter divided by a product of the first drive ratio and the second drive ratio, D2/(R1×R2).

3. The capstan drive of claim 1, wherein:
   the first power transmission is an epicyclic gear train;
   the epicyclic gear train has a first drive ratio of 15/16 between the driven shaft and the second drive shaft;
   the second power transmission has a second drive ratio of 5/4 between the second drive shaft and the second rotary motion;
   the second capstan has a second pitch diameter, D2; and
   the first capstan has a first pitch diameter, D1, that is substantially sixty-four/seventy-fifths of the second pitch diameter, D2/(75/64).

4. The capstan drive of claim 1, wherein the first power transmission is a planetary gear arrangement with the driven shaft coupled to a planetary gear carrier, the first drive shaft coupled to a sun gear, and the second drive shaft coupled to a ring gear.

5. The capstan drive of claim 1, wherein the first power transmission is a compound planetary gear train having a first planetary gear arrangement and a second planetary gear arrangement with a planetary gear carrier of the first planetary gear arrangement coupled to a sun gear of the second planetary gear arrangement, the driven shaft coupled to a planetary gear carrier of the second planetary gear arrangement, the first drive shaft coupled to a sun gear of the first planetary gear arrangement, and the second drive shaft coupled to ring gears of the first and second planetary gear arrangements.

6. The capstan drive of claim 1, wherein the second power transmission is a pair of gears.

7. The capstan drive of claim 1, further comprising:
a third capstan that drives a second device on the carriage; and
a third power transmission having a driven shaft coupled to the third capstan, a first drive shaft coaxial with the driven shaft to receive a third rotary motion for driving the second device, and a second drive shaft coaxial with the driven shaft;
wherein the second power transmission is further to couple the second rotary motion to the second drive shaft of the second epicyclic gear train, the second power transmission having a second drive ratio such that a third cable is driven by the third capstan at a same rate as the cable is driven by the second capstan in response to the second rotary motion if there is no third rotary motion.

8. The capstan drive of claim 1, wherein the device is a rotatable instrument driver.

9. A method of moving a device on a carriage, the method comprising:
rotating a first capstan to drive a first cable that moves the device on the carriage;
rotating a second capstan to drive a second cable that moves the carriage; and
coupling rotation of the second capstan to the first capstan to substantially cancel motion of the first cable relative to motion of the second cable that moves the carriage.

10. The method of claim 9, wherein coupling the rotation of the second capstan to the first capstan includes:
coupling the rotation of the first capstan to a first drive shaft of an epicyclic gear train;
coupling the rotation of the second capstan to a second drive shaft of the epicyclic gear train; and
coupling the first capstan to a driven shaft of the epicyclic gear train.

11. The method of claim 10, wherein:
the epicyclic gear train has a first drive ratio of R1 between the driven shaft and the second drive shaft;
the rotation of the second capstan is coupled to the second drive shaft with a second drive ratio of R2 between the second drive shaft and the rotation of the second capstan;
the second capstan has a second pitch diameter, D2; and
the first capstan has a first pitch diameter, D1, that is substantially the same as the second pitch diameter divided by the product of first drive ratio and the second drive ratio, $D2/(R1 \times R2)$.

12. The method of claim 10, wherein the epicyclic gear train is a planetary gear arrangement with the first drive shaft coupled to a sun gear, the second drive shaft coupled to a ring gear, and the driven shaft coupled to a planetary gear carrier.

13. The method of claim 10, wherein the epicyclic gear train is a compound planetary gear train having a first planetary gear arrangement and a second planetary gear arrangement with a planetary gear carrier of the first planetary gear arrangement coupled to a sun gear of the second planetary gear arrangement, the first drive shaft coupled to a sun gear of the first planetary gear arrangement, the second drive shaft coupled to ring gears of the first and second planetary gear arrangements, and the driven shaft coupled to a planetary gear carrier of the second planetary gear arrangement.

14. The method of claim 10, wherein coupling rotation of the second capstan to the second drive shaft is with a pair of gears.

15. The method of claim 9, wherein the device is a rotatable instrument driver.

16. The method of claim 9, further comprising:
rotating a third capstan to drive a third cable that moves a second device on the carriage; and
coupling the rotation of the second capstan to the third capstan to substantially cancel motion of the third cable relative to motion of the second cable that moves the carriage.

17. A capstan drive comprising:
a first rotating means to rotate a first capstan to drive a first cable at a first rate that moves a device on a carriage;
a second rotating means to rotate a second capstan to drive a second cable at a second rate that moves the carriage; and
a first rotational coupling means to couple the rotation of the second capstan to the first capstan to cause the first capstan to drive the first cable at the sum of the first rate and the second rate such that the motion of the device on the carriage is substantially decoupled from the motion of the carriage.

18. The capstan drive of claim 17, wherein the first rotational coupling means includes:
a power transmission coupled to the rotation of the second capstan; and
an epicyclic gear train coupled to the power transmission, the first rotating means, and the first capstan.

19. The capstan drive of claim 18, wherein:
the epicyclic gear train has a first drive ratio of R1 between the first capstan and the power transmission;
the power transmission has a second drive ratio of R2 between the epicyclic gear train and the second capstan;
the second capstan has a second pitch diameter, D2; and
the first capstan has a first pitch diameter, D1, that is substantially the same as the second pitch diameter divided by the product of first drive ratio and the second drive ratio, $D2/(R1 \times R2)$.

20. The capstan drive of claim 18, wherein the epicyclic gear train is a planetary gear arrangement with the first capstan coupled to a planetary gear carrier, the first rotating means coupled to a sun gear, and the power transmission coupled to a ring gear.

21. The capstan drive of claim 18, wherein the epicyclic gear train is a compound planetary gear train having a first planetary gear arrangement and a second planetary gear arrangement with
a first planetary gear carrier of the first planetary gear arrangement coupled to a second sun gear of the second planetary gear arrangement,
the first capstan coupled to a second planetary gear carrier of the second planetary gear arrangement,
the first rotating means coupled to a first sun gear of the first planetary gear arrangement, and
the power transmission coupled to ring gears of the first and second planetary gear arrangements.

22. The capstan drive of claim 18, wherein the power transmission is a pair of gears.

23. The capstan drive of claim 17, wherein the device is a rotatable instrument driver.

24. The capstan drive of claim 17, further comprising:
a third rotating means to rotate a third capstan to drive a third cable at a third rate that moves a second device on the carriage; and
a second rotational coupling means to couple the rotation of the second capstan to the third capstan to cause the third capstan to drive the third cable at the sum of the third rate and the second rate such that the motion of the second device on the carriage is substantially decoupled from the motion of the carriage.

* * * * *